United States Patent [19]

Oda et al.

[11] Patent Number: 4,519,350
[45] Date of Patent: May 28, 1985

[54] INTAKE SYSTEM FOR AN INTERNAL COMBUSTION ENGINE

[75] Inventors: Hiroyuki Oda; Yasuyuki Morita; Akihito Nagao, all of Hiroshima, Japan

[73] Assignee: Mazda Motor Corporation, Tokyo, Japan

[21] Appl. No.: 488,618

[22] Filed: Apr. 25, 1983

[30] Foreign Application Priority Data

Apr. 26, 1982 [JP] Japan .................. 57-69931

[51] Int. Cl.³ ............................................ F02B 31/00
[52] U.S. Cl. ................................ 123/308; 123/432; 123/188 M; 123/403
[58] Field of Search .............. 123/432, 308, 188 M, 123/52 M, 403

[56] References Cited

U.S. PATENT DOCUMENTS

| | | | |
|---|---|---|---|
| 4,228,772 | 10/1980 | Bakonyi | 123/403 |
| 4,240,387 | 12/1980 | Motosugi et al. | 123/432 |
| 4,241,704 | 12/1980 | Ishida | 123/432 |
| 4,246,874 | 1/1981 | Nakagawa et al. | 123/432 |
| 4,271,803 | 6/1981 | Nakanishi et al. | 123/308 |
| 4,308,830 | 1/1982 | Yamada et al. | 123/308 |
| 4,318,273 | 3/1982 | Nohira et al. | 123/308 |
| 4,318,380 | 3/1982 | Matsumoto | 123/308 |

FOREIGN PATENT DOCUMENTS 55-4355 12/1980 Japan .

*Primary Examiner*—E. Rollins Cross
*Attorney, Agent, or Firm*—Murray, Whisenhunt & Ferguson

[57] ABSTRACT

A dual induction type intake system for an internal combustion engine has a primary intake passageway for light load operation of the engine and a secondary intake passageway for heavy load operation of the engine. The downstream side open end of each intake passageway opens toward the intake port of the cylinder of the engine. The secondary intake passageway is provided with a controllable valve therein. The load on the engine is detected and the controllable valve is opened when the load on the engine is heavier than a predetermined value so that the intake gas is introduced into the combustion chamber through both the primary and secondary intake passageways, while otherwise the controllable valve is closed so that the intake gas is introduced into the combustion chamber only through the primary intake passageway. The primary intake passageway has a flat cross sectional configuration with its longer axis extending substantially in parallel to the lower end surface of the cylinder head, and at the same time the primary intake passageway is throated by narrowing its width, as measured in the horizontal direction, from upstream toward downstream in the direction of the flow of the intake gas. The downstream side open end of the primary intake passageway is offset from the center of the cylinder bore.

9 Claims, 6 Drawing Figures

INTAKE SYSTEM FOR AN INTERNAL COMBUSTION ENGINE

BACKGROUND OF THE INVENTION

1. Field of the Invention

This invention relates to a so-called dual induction type intake system for an internal combustion engine having an intake passageway for heavy load operation of the engine and an intake passageway for light load operation of the engine.

2. Description of the Prior Art

Generally combustion in internal combustion engines tends to deteriorate during light load operation. As is well known, combustion during light load operation can be improved by enhancing the flow of the intake gas in the combustion chamber to increase the flame speed. For example, there have been developed various intake systems for a reciprocating engine having cylindrical cylinders in which the intake port is offset from the center of the cylinder bore or the intake port is directed substantially in perpendicular to the longitudinal or central axis of the cylinder bore to form a swirl of the intake gas along the peripheral inner surface of the cylinder in the combustion chamber. However, when such a swirl is formed, the intake resistance is increased, which is disadvantageous from the point of increasing the amount of charge. Therefore, it is preferable that the swirl not be formed during heavy load operation in which a good combustion condition can be generally obtained even without forming a swirl.

Thus, there has been proposed in Unexamined Japanese Utility Model Publication No. 55(1980)-4355 an intake system utilizing primary and secondary intake passageways both of which open toward an intake port of the cylinder bore. An intake valve is provided in the intake port to close and open the primary and secondary intake passageways together. However, an independent controllable valve is provided in the secondary intake passageway to selectively close and open it. The open end of the secondary intake passageway toward the intake port is larger than that of the primary intake passageway and is directed substantially in the direction of the central axis of the cylinder bore, while the open end of the primary intake passageway toward the intake port is offset from the center of the cylinder bore and directed in a direction substantially perpendicular to the central axis of the cylinder bore. When the engine is operated under light load, the intake gas is introduced into the combustion chamber only through the primary intake passageway with the secondary intake passageway closed by the controllable valve provided therein, thereby enhancing the swirl formed in the combustion chamber to improve combustion therein. When the engine is operated under heavy load, the controllable valve is opened and the intake gas is introduced into the combustion chamber through both the primary and secondary intake passageways, thereby reducing the intake resistance so that the amount of charge can be easily increased. This system is called the "dual induction system".

SUMMARY OF THE INVENTION

The primary object of the present invention is to provide an improved dual induction type intake system for an internal combustion engine in which the swirl forming effect by the primary intake passageway or the intake passageway for light load operation is greatly enhanced.

The dual induction type intake system of the present invention is characterized in that the intake passageway for light load operation whose open end toward the intake port is offset from the center of the cylinder bore has a flat cross sectional configuration with its longer axis extending in parallel to the lower end surface of the cylinder head and at the same time the intake passageway for light load operation is throated by narrowing its width, as measured in the horizontal direction, from upstream toward downstream in the direction of the flow of the intake gas.

When the cross sectional configuration of the intake passageway for light load operation is flat, the horizontal component of the flow of the intake gas is increased. By narrowing the cross sectional area of the intake passageway for light load operation, the flow speed of the intake gas is increased. Thus the swirl of the intake gas is much more enhanced in the intake system of the present invention. Further, in the intake system of the present invention, the intake passageway for light load operation is throated by narrowing the width thereof as measured in the horizontal direction. Accordingly the substantially horizontal direction of the intake passageway is maintained and therefore the horizontal component of the flow of the intake gas is not reduced to weaken the swirl of the intake gas due to the fact that the intake passageway is throated.

DESCRIPTION OF THE PREFERRED EMBODIMENT

Figure 1:
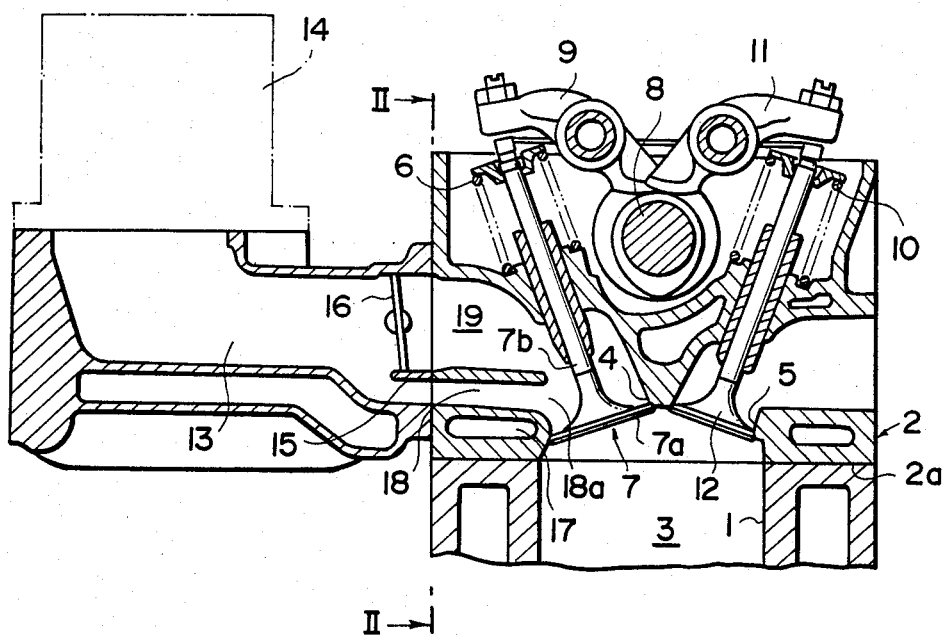
FIG. 1 is a cross sectional view showing an intake system in accordance with an embodiment of the present invention.

FIG. 1 shows in cross section an intake system for an internal combustion engine in accordance with an embodiment of the present invention. A combustion chamber 3 defined by the cylinder head 2 of a cylinder 1 and a piston (not shown) is provided with an intake port 4 and an exhaust port 5. The intake port 4 is provided with an intake valve 7 which is normally positioned in its closed position by means of a return spring 6. The intake valve 7 is pushed into the combustion chamber 3 to open the intake port 4 by a rocker arm 9 which is driven by a cam 8 rotating in synchronization with the crankshaft (not shown). The exhaust port 5 is provided with an exhaust valve 12 which is normally urged toward its closed position by means of a return spring 10 and is pushed into the combustion chamber 3 to open the exhaust port 5 by a rocker arm 11.

Figure 2:
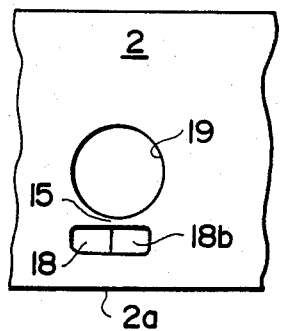
FIG. 2 is a fragmentary cross sectional view taken along line II—II in FIG. 1.

The intake port 4 is connected to a carburetor 14 by way of an intake manifold 13 to feed the intake gas, which may be an air-fuel mixture or solely air, to the combustion chamber 3. A partition wall 15 is provided in the end portion of the intake manifold 13 near the intake port 4 to divide the end portion into upper and lower parts. The lower part of the end portion of the intake manifold 13 forms a primary intake passageway 18 through which the intake gas is introduced into the combustion chamber 3 when the engine is operated under light load, while the upper part of the end portion forms a secondary intake passageway 19 which is opened only when the engine is operated under heavy load so that the intake gas is introduced into the combustion chamber 3 through both the primary and secondary intake passageways 18 and 19 as will be described hereinbelow. On the upstream side end of the secondary intake passageway 19 is provided a controllable valve 16 to selectively open and close the secondary intake passageway 19. As shown in FIG. 2, which is a fragmentary cross sectional view taken along line II—II in FIG. 1, the secondary intake passageway 19 has a circular cross section and has a relatively large cross sectional area, while the primary intake passageway 18 has a flat cross section with the longer side extending substantially in parallel to the lower end surface 2a of the cylinder head 2, and has a relatively small cross sectional area. The downstream side end portion of the secondary intake passageway 19 is bent downwardly so that the downstream end thereof opens toward the intake port 4 substantially along the central axis of the cylinder 1. On the other hand, the primary intake passageway 18 extends substantially in parallel to the lower end surface 2a of the cylinder head 2, i.e., substantially in perpendicular to the central axis of the cylinder 1, and the downstream side open end 18a thereof is directed in a direction substantially parallel to the lower end surface 2a of the cylinder head 2 as clearly shown in FIG. 1.

Figure 3:
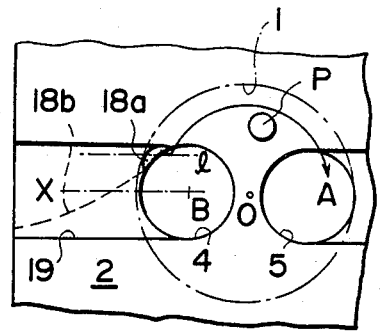
FIG. 3 is a schematic fragmentary plan view of the cylinder head employed in the intake system of FIG. 1 with the intake valve, the exhaust valve and the driving mechanism for driving them omitted.

FIG. 3 is a fragmentary plan view of the cylinder head 2 with the intake valve 7, the exhaust valve 12 and the driving mechanism for driving them omitted. As can be seen from FIG. 3, the secondary intake passageway 19 is directed so that its center is substantially aligned with the center L of the cylinder 1, while one side wall 18b (the lower side wall as seen in FIG. 3) of the primary intake passageway 18 gradually approaches to the other side wall so that the cross sectional area of the primary intake passageway 18 is gradually throated toward the downstream side open end 18a, whereby the center O of the downstream side open end 18a of the primary intake passageway is offset from the center O of the cylinder 1. Further, a water jacket 17 through which engine cooling water is circulated is formed below the primary intake passageway 18. An ignition plug P is positioned upstream of the exhaust port 5 with respect to the flow of the intake gas introduced into the combustion chamber 3 through the primary intake passageway 18. This position is advantageous in that the ignition plug P is positively fed with fresh intake gas, whereby positive ignition can be ensured even if the intake gas is lean.

Now the operation of the intake system of this embodiment will be described hereinbelow. The load on the engine is detected by way of, for example, the opening angle of the throttle valve (not shown) in the carburetor 14, the negative pressure in the venturi, or the pressure of the exhaust gas. The controllable valve 16 in the secondary intake passageway 19 is opened and the intake gas is introduced into the combustion chamber 3 through both the primary and secondary intake passageways 18 and 19 when the load on the engine is not lighter than a predetermined value, while when the load on the engine is lighter than the predetermined value, the valve 16 is closed so that the intake gas is introduced into the combustion chamber 3 only through the primary intake passageway 18. Preferably, the rotational speed of the engine is also detected and the controllable valve 16 is closed when the engine is operated at a low speed and under light load and is opened when the engine is operated at a high speed and under heavy load. As explained above, combustion in the combustion chamber 3 tends to be deteriorate during light load operation of the engine. However, combustion during light operation of the engine can be improved by introducing the intake gas into the combustion chamber 3 only through the narrow primary intake passageway 18 so that the flow speed of the intake gas is increased to enhance the flow of the intake gas in the combustion chamber 3. Further, since the center l of the open end 18a of the primary intake passageway 18 is offset from the center O of the cylinder 1 and at the same time the primary intake passageway 18 extends substantially in perpendicular to the central axis of the cylinder 1, the intake gas introduced into the combustion chamber 3 forms a swirl flowing along the peripheral inner surface of the cylinder 1 as shown by the arrow A in FIG. 3, whereby the flow of the intake gas in the combustion chamber 3 is further enhanced. Further since the primary intake passageway 18 is throated by said one side wall 18b with the horizontal direction thereof being maintained, the speed of the horizontal component of the intake gas passing through the primary intake passageway 18 is more increased and the swirl is more effectively formed in the combustion chamber 3, whereby combustion in the combustion chamber 3 is highly improved. Combustion in the combustion chamber 3 is also improved by virtue of the fact that the intake gas passing through the primary intake passageway 18 is preheated by the cooling water circulating through the water jacket 17.

Preferably the open end 18a of the primary intake passageway 18 is so positioned that the intake gas passing therethrough is introduced into the combustion chamber 3 through the space between the upper surface of the valve head 7a of the intake valve 7 and the lower surface of the valve seat when the intake valve 7 is opened and at the same time the center l of the open end 18a is completely offset from the valve stem 7b of the intake valve 7 toward the turning direction of the swirl to be formed as clearly shown in FIG. 3 in which the central axis of the valve stem 7b is indicated at X. With this arrangement, the intake gas can be introduced into the combustion chamber 3 without the flow speed of the intake gas being reduced, which is advantageous in enhancing the swirl in the combustion chamber 3. Further, with this arrangement, a strong swirl can be produced even if the amount of the intake gas is small and it is difficult to give the intake gas a strong directivity solely by the configuration of the primary intake passageway 18. That is, if the open end of the primary intake passageway 18 is offset from the axis X of the valve stem 7a downwardly as seen in FIG. 3, the majority of the intake gas is apt to be directed in the direction opposite to the desired direction when the amount of the intake gas is small, whereby it becomes difficult to produce a strong swirl. The above arrangement permits the majority of the intake gas to enter the combustion chamber 3 in a location desirable to produce the swirl which location is offset from the valve stem 7a in the turning direction of the swirl to be produced, thereby ensuring a strong swirl irrespective of the amount of the intake gas. This is particularly important when the primary intake passageway is formed below the secondary intake passageway therealong. Generally it is preferred that the primary intake passageway be formed below the secondary intake passageway therealong since an aftertreatment such as machining is generally required when the primary intake passageway 18 is inclined with respect to the secondary intake passageway 19 by a large angle.

When the load on the engine is not lighter than the predetermined value, the controllable valve 16 in the secondary intake passageway 19 is opened and the intake gas is introduced into the combustion chamber 3 through both the primary and secondary intake passageways 18 and 19. This reduces the intake resistance and restricts occurrence of the swirl, whereby the amount of charge can be smoothly increased. Further since the amount of the intake gas passing through the primary intake passageway 18 is less when the secondary intake passageway 19 is opened, the preheating of the intake gas by the water jacket 17 is limited. Accordingly, reduction of the density of the intake gas due to expansion thereof does not occur and the tendency for the amount of charge to be reduced due to reduction of the density of the intake gas can be restricted. It is thus advantageous to reduce the amount of the intake gas passing through the primary intake passageway when the engine is operated under light load. Therefore, it is preferred that the cross sectional area of the secondary intake passageway 19 be large enough to permit the whole amount of the intake gas required during operation of the engine under the maximum load to be fed by the secondary intake passageway 19 alone.

Though the primary intake passageway 18 is continuously throated in the downstream direction in the above embodiment, the primary intake passageway 18 may be throated stepwisely. However, it is preferred from the viewpoint of loss of the speed of the intake gas due to throating that the primary intake passageway 18 be continuously throated. Further the primary intake passageway 18 is throated by letting one side wall 18b thereof continuously approach to the other side wall in the above embodiment. This causes the intake gas to enter the combustion chamber 3 in a direction nearly tangential to the cylinder 1, which is advantageous in enhancing the swirl.

Though the fuel is fed from the carburetor 14 in the above embodiment, the fuel may be fed by an injection nozzle, for example, disposed upstream of the upstream side ends of the intake passageways 18 and 19.

Now another embodiment of the present invention will be described referring to FIGS. 4 to 6. The embodiment shown in FIGS. 4 to 6 is substantially the same as the embodiment shown in FIGS. 1 to 3, and therefore analogous parts are given the same reference numerals as in FIGS. 1 to 3.

Figure 4:
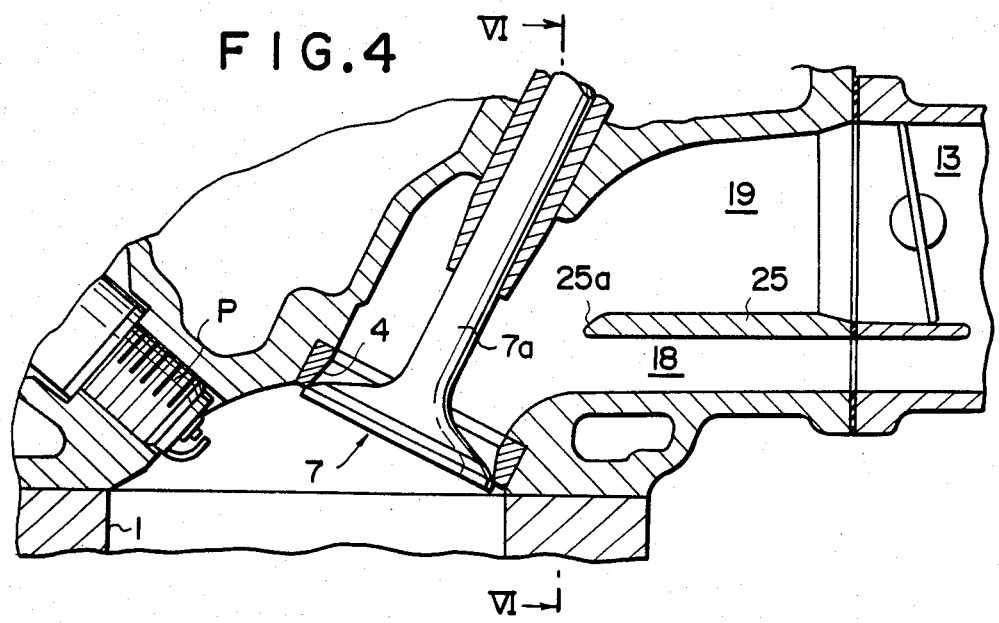
FIG. 4 is a cross sectional view taken along line IV—IV in FIG. 5 showing an intake system in accordance with another embodiment of the present invention.

In this embodiment, the partition wall 25 dividing the end portion of the intake manifold 13 into the primary and secondary intake passageways 18 and 19 terminates at a position relatively far from the intake port 4 and the downstream side end portion 25a of the partition wall 25 tapers toward the intake port 4 as clearly shown in FIG. 4. This reduces the intake resistance due to the partition wall and serves to improve the output power of the engine during heavy load operation.

Figure 5:
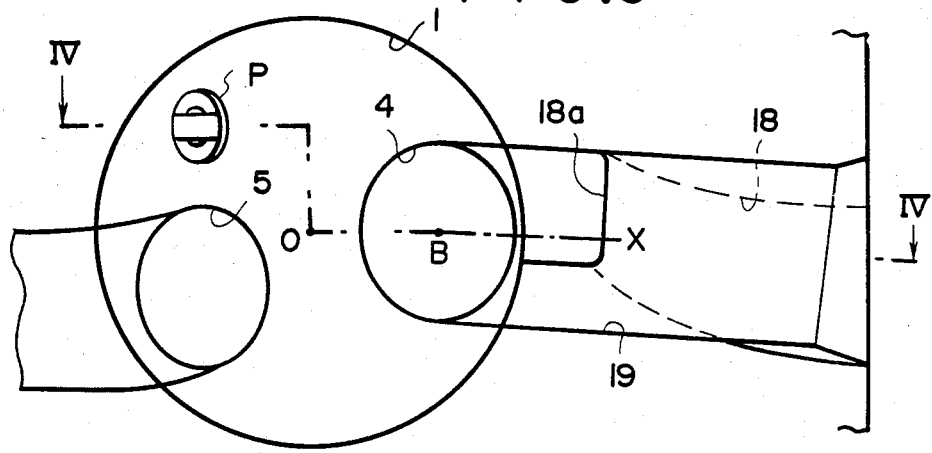
FIG. 5 is a schematic fragmentary plan view, similar to FIG. 3, of the embodiment shown in FIG. 1.
Figure 6:
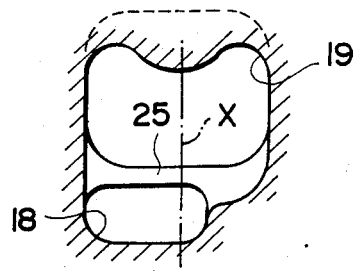
FIG. 6 is a fragmentary cross sectional view taken along line VI—VI in FIG. 4.

Further, unlike in the embodiment shown in FIGS. 1 to 3, in this embodiment both side walls of the primary intake passageway 18 are bent in the turning direction of the swirl to be produced as clearly shown in FIG. 5. This is more preferable to direct the majority of the intake gas in the turning direction of the swirl to be produced.

Further, as clearly shown in FIG. 5, the ignition plug P is positioned upstream of the exhaust port 5 with respect to the flow of the intake gas introduced into the combustion chamber 3 through the primary intake passageway 18. This permits the ignition plug P to be positively fed with fresh intake gas, thereby ensuring positive ignition even if the intake gas is lean.

It is preferred that the intake valve 7 be positioned so that the axis X of the valve stem 7a thereof extends, as viewed in plan, on the line OB connecting the center O of the cylinder 1 and the center B of the intake port 4 and the secondary intake passageway 19 be formed so that the central axis thereof extends substantially on the axis X of the valve stem 7a as shown in FIGS. 5 and 6. With this arrangement the intake gas introduced into the combustion chamber 3 can travel a relatively long distance before it encounters the cylinder wall, whereby the intake resistance due to the cylinder wall can be reduced and accordingly the amount of charge can be increased when the engine is operated under heavy load.

The operation of the embodiment shown in FIGS. 4 to 6 is the same as that of the embodiment shown in FIGS. 1 to 3 and accordingly will not be described here.

We claim:

1. An improved intake system for an internal combustion engine comprising a primary intake passageway which has an opened end directed toward an intake port of a combustion chamber formed in a cylinder head having and exhaust port and an ignition plug and which connects the intake port with an intake gas source, a secondary intake passageway having an open end directed toward the intake port to connect it to an intake gas source, and intake valve provided in the intake port to close and open it, and a controllable valve means which is adapted to be opened so that the intake gas is introduced into the combustion chamber through both the primary and secondary intake passageways when the load on the engine is not lighter than a predetermined value and to be closed otherwise so that the intake gas is introduced into the combustion chamber only through the primary intake passageway, the center of the primary intake passageway being offset from the center of the cylinder bore, the improvement comprising that the primary intake passageway formed in the cylinder head extends substantially in parallel with the lower end surface of the cylinder head in the vicinity of the intake port so as to introduce the intake gas into the combustion chamber in the direction parallel with said lower end surface the primary intake passageway formed in the cylinderhead has a flat cross sectional configuration in the vicinity of the intake port with its longer axis extending substantially in parallel to the lower end surface of the cylinder head and the primary intake passageway formed in the cylinder head is throated in the vicinity of the intake port by narrowing its width as measured in the direction of the longer axis from upstream toward downstream in the direction of the flow of the intake gas.

2. An intake system as defined in claim 1 in which the width of said primary intake passageway is narrowed continuously.

3. An intake system as defined in claim 1 in which the center of said open end of the primary intake passageway is offset from the central axis of the valve stem of said intake valve in the direction along which the intake gas is to be introduced into the combustion chamber.

4. An intake system as defined in claim 3 in which said primary intake passageway is formed below said secondary intake passageway substantially therealong.

5. An intake system as defined in claim 1 in which the ignition plug is disposed upstream of the exhaust port in the direction of the flow of the intake gas introduced into the combustion chamber through the primary intake passageway.

6. An intake system as defined in claim 4 in which a water jacket through which engine cooling water is circulated is formed below said primary intake passageway.

7. An improved intake system for an internal combustion engine comprising a secondary intake passageway which has an open end directed toward an intake port of a combustion chamber formed in a cylinder having an exhaust port and an ignition plug and which connects the intake port with an intake gas source, a primary intake passageway having an open end directed toward said secondary intake passageway in the vicinity of the intake port to connect it to an intake gas source, an intake valve provided in the intake port to close and open it, and a controllable valve means which is adapted to be opened so that the intake gas is introduced into the combustion chamber through both the primary and secondary intake passageway at least during heavy load high speed operation and to be closed so that the intake gas is introduced into the combustion chamber only through the primary intake passageway at least during light load low speed operation, the center of the primary intake passageway being offset from the center of the cylinder bore, the improvement comprising that the primary intake passageway formed in the cylinder head extends substantially in parallel with the lower end surface of the cylinder head in the vicinity of the intake port so as to introduce the intake gas into the combustion chamber in the direction parallel with said lower end surface, and the primary intake passageway is throated by narrowing its width as measured in the direction parallel with said lower end surface from upstream toward downstream in the direction of the flow of the intake gas while its height is kept constant.

8. An intake system as defined in claim 7 in which said primary intake passageway has a flat cross sectional configuration with its longer axis extending substantially in parallel with the lower end surface of the cylinder head.

9. An intake system as defined in claim 8 in which the width of said primary intake passageway is narrowed continuously and the center of said open end of the primary intake passageway is offset from the central axis of the valve stem of said intake valve in the direction along which the intake gas is to be introduced into the combustion chamber.

* * * * *